United States Patent
Boss et al.

(10) Patent No.: US 10,970,334 B2
(45) Date of Patent: Apr. 6, 2021

(54) NAVIGATING VIDEO SCENES USING COGNITIVE INSIGHTS

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Yin Xia, Beijing (CN); Yu Lin Zhai, Beijng (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 294 days.

(21) Appl. No.: 15/657,626

(22) Filed: Jul. 24, 2017

(65) Prior Publication Data
US 2019/0026367 A1   Jan. 24, 2019

(51) Int. Cl.
  *G06F 16/783* (2019.01)
  *G06K 9/00* (2006.01)
(52) U.S. Cl.
  CPC ..... *G06F 16/7844* (2019.01); *G06K 9/00677* (2013.01); *G06K 9/00711* (2013.01)
(58) Field of Classification Search
  USPC ........................................................ 707/749
  See application file for complete search history.

(56) References Cited

U.S. PATENT DOCUMENTS 6,580,437 B1   6/2003   Liou et al.
6,813,618 B1 *  11/2004   Loui ................. G06F 16/5838
(Continued)

FOREIGN PATENT DOCUMENTS

CN   102142089 A   1/2011
CN   103268635 A   5/2013
(Continued)

OTHER PUBLICATIONS

Vinyals et al., "Show and Tell: A Neural Image Caption Generator," http://www.cv-foundation.org/openaccess/content_cvpr_2015/papers/Vinyals_Show_and_Tell_2015_CVPR_paper.pdf, pp. 1-9.
(Continued)

*Primary Examiner* — Tamara T Kyle
*Assistant Examiner* — Raheem Hoffler
(74) *Attorney, Agent, or Firm* — Cantor Colburn LLP; Brian Restauro

(57) ABSTRACT

Embodiments of the invention include method, systems and computer program products for obtaining a scene from a database. Aspects of the invention include receiving a search request for a scene stored in a database including annotated video content. One or more keywords are extracted from the search request. Extended keywords are generated for each keyword. The extended keywords and keywords are compared to the annotated video content to identify target scenes including target scene annotations. A confidence rating is assigned to each of the target scenes based at least in part on a correlation between the target scene annotations for each of the target scenes and the extended keywords and keywords. And at least one of the target scenes are displayed to the user, wherein the at least one of the target scenes is determined based on the confidence ratings.

13 Claims, 7 Drawing Sheets

(56) References Cited

U.S. PATENT DOCUMENTS

| | | | |
|---|---|---|---|
| 7,512,537 B2 | 3/2009 | Pahud et al. | |
| 9,177,080 B2 | 11/2015 | Ambwani et al. | |
| 2008/0016068 A1 | 1/2008 | Takagi et al. | |
| 2008/0046925 A1* | 2/2008 | Lee | G11B 27/11 725/37 |
| 2008/0250011 A1* | 10/2008 | Haubold | G06F 16/43 |
| 2011/0047163 A1* | 2/2011 | Chechik | G06F 16/7867 707/741 |
| 2013/0129142 A1 | 5/2013 | Miranda-Steiner | |
| 2013/0166303 A1* | 6/2013 | Chang | G06F 16/7834 704/258 |
| 2014/0105573 A1 | 4/2014 | Hanckmann et al. | |
| 2015/0135077 A1* | 5/2015 | Fuzell-Casey | G06F 16/78 715/719 |
| 2015/0139610 A1* | 5/2015 | Syed | G11B 27/11 386/241 |
| 2015/0227528 A1* | 8/2015 | Kang | G06F 16/951 707/750 |
| 2015/0242679 A1* | 8/2015 | Naveh | G06F 16/5866 382/100 |
| 2015/0296228 A1* | 10/2015 | Chen | G06F 16/78 725/34 |
| 2015/0310894 A1 | 10/2015 | Stieglitz | |
| 2015/0318020 A1* | 11/2015 | Pribula | H04N 9/8205 386/227 |
| 2015/0350730 A1* | 12/2015 | el Kaliouby | A61B 5/165 725/12 |
| 2016/0098998 A1 | 4/2016 | Wang et al. | |
| 2017/0280191 A1* | 9/2017 | Stathacopoulos | G06F 16/7837 |
| 2017/0289619 A1* | 10/2017 | Xu | H04N 21/251 |
| 2018/0373547 A1* | 12/2018 | Dawes | G06F 16/951 |
| 2018/0374029 A1* | 12/2018 | Henry | G06N 3/006 |

FOREIGN PATENT DOCUMENTS

| | | |
|---|---|---|
| CN | 105117429 A | 8/2015 |
| CN | 150933538 A | 6/2016 |
| JP | 201129795 A | 2/2011 |

OTHER PUBLICATIONS

International Search Report; PCT Application No. PCT/IB2018/054963; dated Oct. 17, 2018; 9 pages.

* cited by examiner

NAVIGATING VIDEO SCENES USING COGNITIVE INSIGHTS

BACKGROUND

The present disclosure relates to navigating video scenes and, more specifically, to methods and systems for navigating video scenes using cognitive insights.

With the continuous escalation of computer performance, digital video usage has become ever more commonplace. Watching videos has become one of the most popular entertainment activities in our daily lives, as evidenced by studies which show over 50% of internet bandwidth is consumed by video services. With readily available video cameras, smartphones, and other handheld devices, people are recording more and more of their travel, important celebrations, and family time. Moreover, digital video technology is used in most surveillance systems.

However, problems with using and managing these vast amounts of video data do arise. People may want to watch a specific scene of a movie or a home video instead of the entire video. Similarly, police or security personnel may want to find and gather evidence from a tremendous amount of video data.

It is often time-consuming and difficult to find and navigate to a specific scene in one or more video files. Using existing techniques a user must view a video by using a fast forward mode or dragging a slider bar over and over until the desired scene is found. Additionally, some videos are broken down by chapters and a user can navigate to a specific chapter where the scene may be located. These techniques require a lot of navigating from a user's memory of a video to find a scene. Also, a user may not have viewed a video before and may be searching for a scene based on a recommendation from another viewer.

There are some solutions in this space but they do not directly address the need. For example, many modern video players "remember" the last break point for playing a movie, so that a film is automatically resumed the next time from where it left off. But this solution is based on historical records and is designed for a single user and client, so it would not work well if there is no previous record for a given user, or in multi-user situations.

Other systems use facial recognition to find a specific person in a video stream; however, this does not address the problem of finding a specific scene using a general description and it does not address finding a specific scene when that individual is in multiple scenes. Using this technology in this scenario would be a problem since the numerous results provided to the user would require additional manual filtering. Accordingly, a new method is needed, with which a wanted scene can be rapidly and accurately discovered from either a single video or a large volume of video data.

SUMMARY

Embodiments include a computer-implemented method for obtaining a scene from a database. A non-limiting example of the computer-implemented method includes receiving a search request for a scene stored in a database including annotated video content. One or more keywords are extracted from the search request. Extended keywords are generated for each keyword. The extended keywords and keywords are compared to the annotated video content to identify target scenes including target scene annotations. A confidence rating is assigned to each of the target scenes based at least in part on a correlation between the target scene annotations for each of the target scenes and the extended keywords and keywords. And at least one of the target scenes are displayed to the user, wherein the at least one of the target scenes is determined based on the confidence ratings.

Embodiments include a computer system for obtaining a scene from a database, the computer system having a processor, the processor configured to perform a method. A non-limiting example of the system includes receiving a search request for a scene stored in a database including annotated video content. One or more keywords are extracted from the search request. Extended keywords are generated for each keyword. The extended keywords and keywords are compared to the annotated video content to identify target scenes including target scene annotations. A confidence rating is assigned to each of the target scenes based at least in part on a correlation between the target scene annotations for each of the target scenes and the extended keywords and keywords. And at least one of the target scenes are displayed to the user, wherein the at least one of the target scenes is determined based on the confidence ratings.

Embodiments also include a computer program product for obtaining a scene from a database, the computer program product including a non-transitory computer readable storage medium having computer readable program code embodied therewith. The computer readable program code including computer readable program code configured to perform a method. A non-limiting example of the method includes receiving a search request for a scene stored in a database including annotated video content. One or more keywords are extracted from the search request. Extended keywords are generated for each keyword. The extended keywords and keywords are compared to the annotated video content to identify target scenes including target scene annotations. A confidence rating is assigned to each of the target scenes based at least in part on a correlation between the target scene annotations for each of the target scenes and the extended keywords and keywords. And at least one of the target scenes are displayed to the user, wherein the at least one of the target scenes is determined based on the confidence ratings.

Embodiments include a computer-implemented method for annotating video scenes. A non-limiting example of the computer-implemented method includes receiving, by a processor, one or more videos. Each of the one or more videos is partitioned into a set of scenes. A first scene in the set of scenes is analyzed to determine a set of labels for the first scene. The first scenes is annotated with the set of labels and stored in a database.

Embodiments include a computer system for annotating video scenes, the computer system having a processor, the processor configured to perform a method. A non-limiting example of the system includes receiving, by a processor, one or more videos. Each of the one or more videos is partitioned into a set of scenes. A first scene in the set of scenes is analyzed to determine a set of labels for the first scene. The first scenes is annotated with the set of labels and stored in a database.

Additional features and advantages are realized through the techniques of the present invention. Other embodiments and aspects of the invention are described in detail herein and are considered a part of the claimed invention. For a better understanding, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
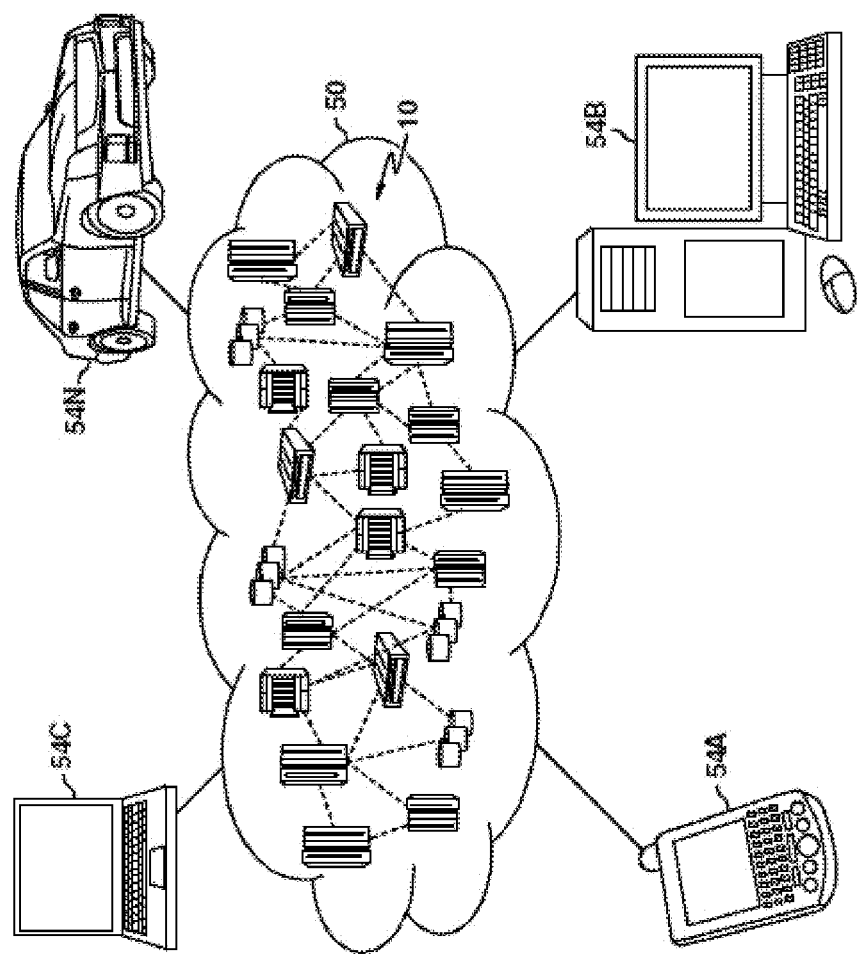
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
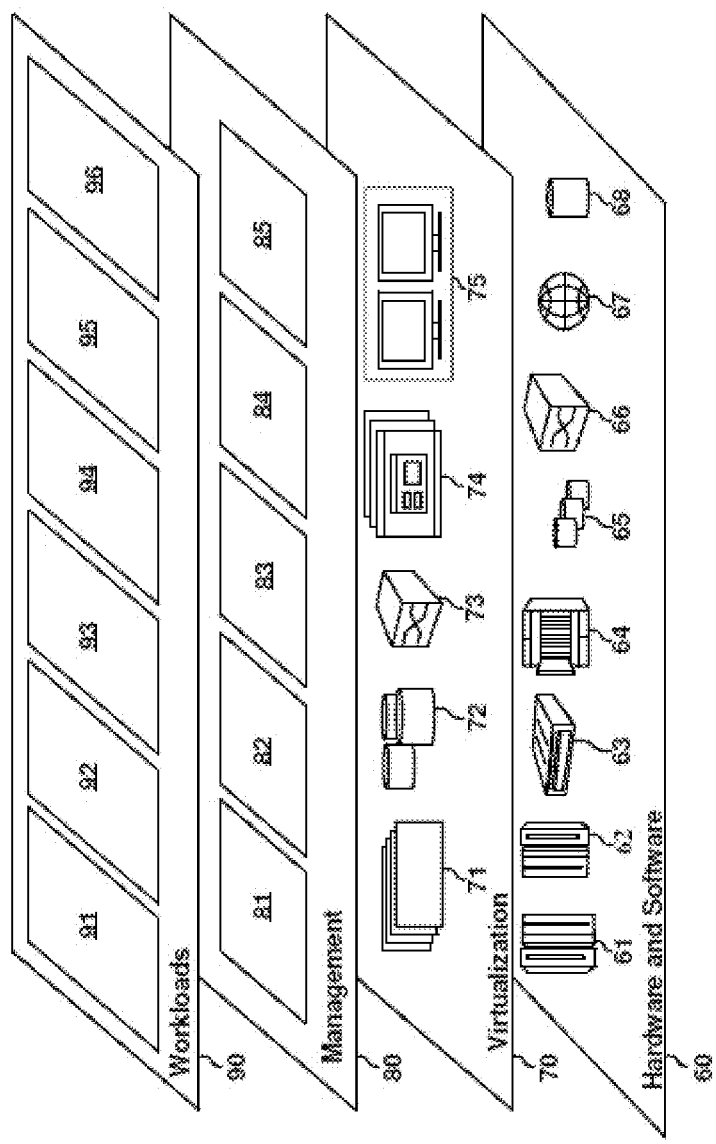
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; obtaining video from a database 95; and annotating video scenes 96.

Figure 3:
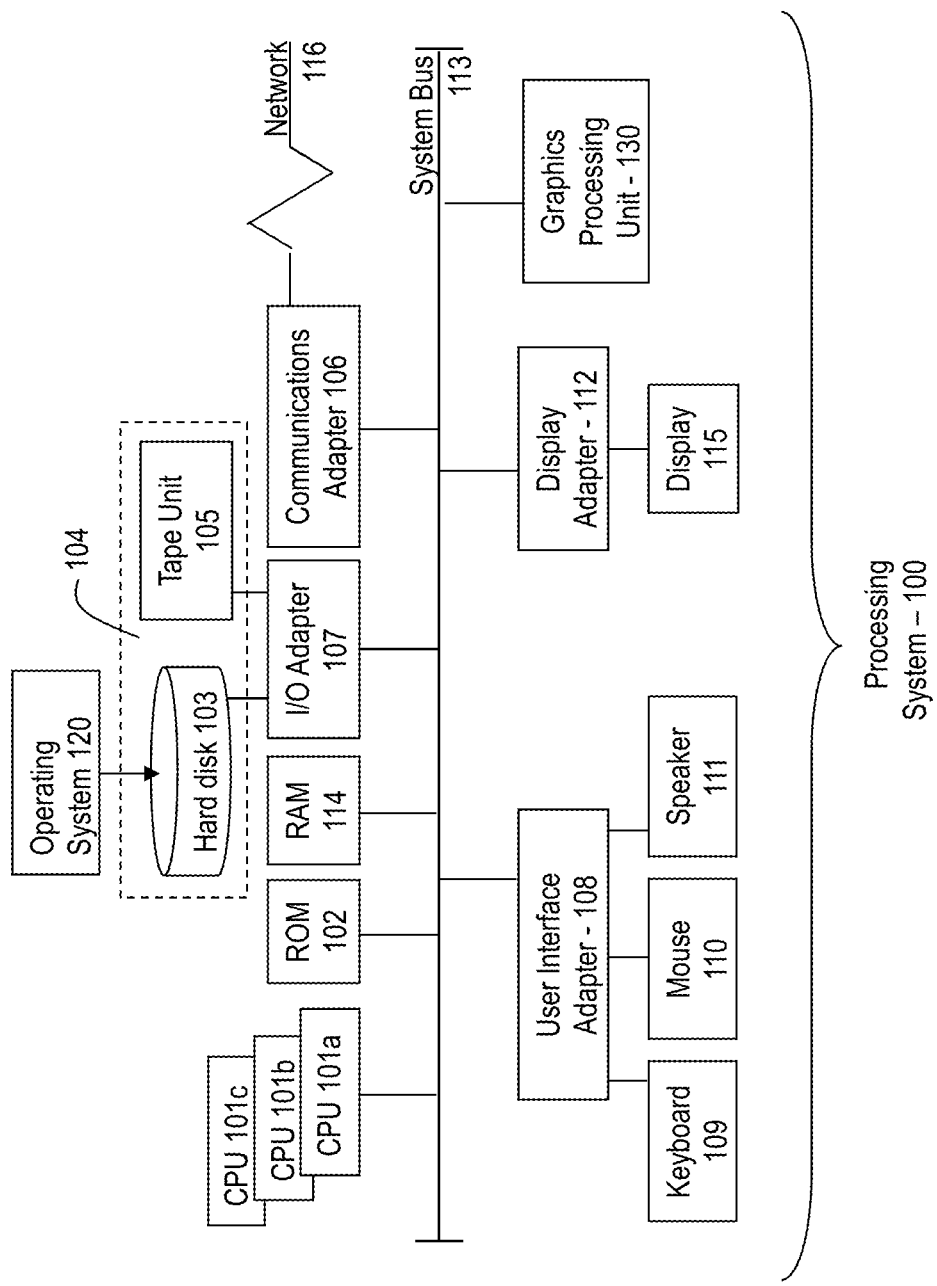
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

One or more embodiments of the invention provide systems, methods, and computer program products for annotating video scenes and obtaining a video scene from a database. Aspects of the invention include analyzing video content utilizing techniques to identify objects, entities, actions, concepts, and sentiments within a video scene and providing labels associated with the video scenes. These labels can be in the form of keywords or in natural language descriptions (i.e., sentences describing the video scene). In addition to the keyword labels, extended keywords are created that are associated with the extracted keywords. For example, a keyword such as "baseball" can be associated with extended keywords such as field, pitcher, stadium, mound, bases, and the like. These extended keywords can be annotated with the video scene as well. These annotated video scenes can be stored in a database for search.

In one or more embodiments of the invention, a user can search for video scenes in the database. A user can submit a search request for a video scene stored in the database. The search request can be an audio input from the user or a textual input from the user for a specific video scene. From the search request, keywords can be extracted and compared to the annotations of the video scenes to determine a list of matching scenes. Additionally, extended keywords can be created from the extracted keywords of the search request. The extended keywords can be compared to the annotations of the videos scenes to determine a list of matching scenes.

Figure 4:
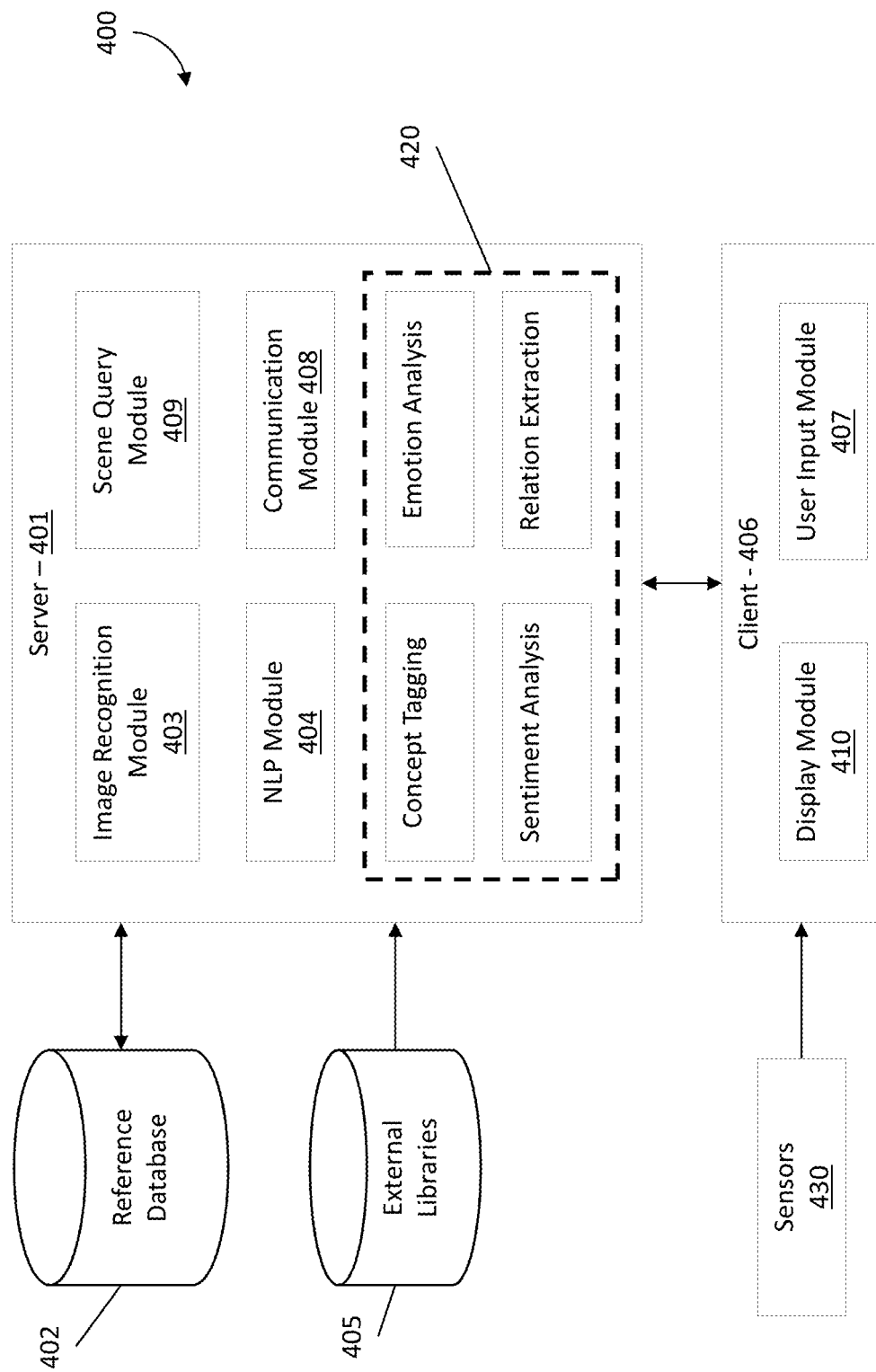
FIG. 4 depicts a block diagram of a system for navigating digital video in accordance with one or more embodiments.

FIG. 4 depicts a block diagram of a system 400 for navigating digital video according to one or more embodiments. The system 400 includes a server 401, a reference database 402 for video scenes, external libraries 405, and a client 406. The server 401 includes an image recognition module 403, a natural language processing (NLP) module 404, and a communications module 408. The server 401 also includes an analytics module 420 which includes concept tagging, emotion analysis, sentiment analysis, and relation extraction. The client 406 includes a user input module 407, a display module 410, and a sensor 430 that is in electronic communication with the client 406.

In one or more embodiments of the invention, the server 401, client 406, image recognition module 403, the natural language processing module 404, the communications module 408, and the analytics module 420 can be implemented on the processing system 100 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the present invention, the system 400 can be utilized for annotating video data. Annotating video data includes applying annotations in the form of semantic properties (in word form or sentence form, e.g., tags, description, and the like) associated with the corresponding video scenes. The system 400 includes a server 401 and a reference database 402 that stores video data. The video data can include movies, television programming, internet videos, and the like. The video data can be partitioned into video scenes of varying lengths. The length of a scene can be correlated with a theme or concept. For example, a full wedding scene in a video may occur over several minutes; however, the full wedding scene can be further partitioned into shorter scenes based on the action occurring or the settings such as a walk down the aisle or the reception of the wedding. The video data can be further partition based on concepts, emotions, and sentiments for the video scenes.

The server 401 annotates (sometimes referred to as "tags" or "tagging") the video scenes on the reference database 402 utilizing an analytics module 420 that utilizes concept tagging, emotion analysis, sentiment analysis, and relation extraction. The server 401 also utilizes an image recognition module 403 to identify objects within a video scene. An NLP module 404 is utilized to analyze and identify the audio in each of the video scenes for extraction of concepts, emotions, sentiment, relational analysis and annotation of the video scenes.

Sentiment analysis techniques include identifying and categorizing opinions expressed in text and audio (through NLP) to determine an attitude of a speaker or other subject with respect to a topic, product, or overall contextual polarity or emotional reaction to an object, interaction, or event. The sentiments that can be extracted include but are not limited to positive, negative, and neutral. The attitude can be a judgment or evaluation, an affective state (i.e., emotional state), or an intended emotional communication (i.e., emotional effect intended by the speaker). In addition to emotions extracted through sentiment analysis as described above, emotional analysis can also include analyzing the face of an individual, through techniques such as facial expression recognition, to determine one or more emotions of the individual. The emotional analysis can also determine changes of emotions of an individual based at least in part on facial expression recognition.

The image recognition module 403 is utilized to determine objects in various video scenes taken from the reference database 402. Image recognition is performed to recognize and identify shapes and objects in multiple images in a scene. The particular image recognition algorithm used during the performing of the image recognition can be any suitable image or pattern recognition algorithm available for the particular application or processing constraints. The image recognition algorithm may be limited by available databases for providing the matching of objects in the scene or scenes to known objects. As one example, an image recognition algorithm can involve pre-processing of the image. Pre-processing can include, but is not limited to, adjusting the contrast of the image, converting to greyscale and/or black and white, cropping, resizing, rotating, and a combination thereof. According to certain image recognition algorithms, a distinguishing feature, such as, for example, color, size, or shape, can be selected for use in detecting a particular object. Multiple features providing distinguishing characteristics of the object can be used. Edge detection can be performed to determine edges of objects in the video scene. Morphology may be performed in the image recognition algorithm to conduct actions on sets of pixels, including the removal of unwanted components. In addition, noise reduction and/or filling of regions may be performed. Additionally, an image recognition algorithm, once the one or more objects (and their associated properties) are found/detected in the image, the one or more objects can each be located in the video scene and then classified. The located objects can be classified (i.e. identified as a particular shape or object) by evaluating the located objects according to particular specifications related to the distinguishing features. The particular specifications can include mathematical calculations or relations. In another example, instead of or in addition to locating recognizable objects in the video scene, pattern matching can be performed. Matching can be carried out by comparing elements and/or objects in the image to "known" (previously identified or classified) objects and elements (e.g., labeled training data). The image recognition module 403 can utilize machine learning by comparing identified objects in a video scene to labeled training data to verify the accuracy of the identification. The image recognition module 403 can utilize neural networks (NN) and other learning algorithms. The identification process for the image recognition module 403 can include confidence levels for the identification such as a threshold confidence. Any identification of an object with a confidence below the threshold can be discarded. If the identification of an object has a confidence above a certain threshold, the object can be annotated (labeled) for the scene. For example, a scene could include a vehicle in the background and the image recognition module 403 can identify the vehicle as a motorcycle, the label or annotation can include the label "motorcycle" for the scene. The image recognition module 403 can also identify characteristics about the motorcycle such as, for example, color, location, whether it is in operation or parked, brand, and the like. It should be understood that although certain of the described embodiments and examples can make reference to image recognition, this should not be construed as limiting the described embodiments and examples to just an image. For example, a video signal can be received by the system 400 and undergo an automatic tag generation process as described in accordance with one or more embodiments of the invention. One or more video frames from the reference database 402 can be received, where the video frame can include an image and image recognition can be performed.

In one or more embodiments of the present invention, the image recognition module 403 is utilized to identify persons, objects, entities, and other features in a video scene. The analytics module 420 is utilized to determine relations between these persons, objects, entities, and other features for annotation of the video scenes. For example, the identification of a character in a courtroom along with relation extraction can identify the character as a judge. The annotation for the scene can be tagged with keywords related to legal proceedings or to judgments, and the like. The character, once identified, can be cross-referenced with external libraries 405. External libraries 405 include but are not limited to the internet movie database (IMDB), electronic program guide (EPG), and other similar external libraries related to video scenes. The identification of the character can be further improved by cross-referencing a character description in the external libraries 405 to confirm, in the example above, the character is a judge.

Text and speech analysis through the NLP module 404 is utilized to analyze captioning/subtitles and dialogues associated with a video scene. The analytics module 420 is utilized to determine sentiment, entities, action, and concepts. For example, audio data associated with the video scene can be analyzed by the NLP module 404 to convert the audio data to text through techniques such as speech to text (STT). In text format, keywords can be extracted for annotation of the video scene.

In one or more embodiments, the server 401 can communicate with a client 406 through the communication module 408. The client 406 includes one or more sensors 430 that are in electronic communication with the client 406. The client 406 can be any type of computer or interface for displaying, through the display module 410, a video scene for an audience. For example, the client 406 could be a smartphone that is displaying a video scene on the smartphone for view by a group of individuals around the smartphone (i.e., the audience). The sensors 430 can include a camera and/or microphone. In the example, the sensors 430 could be the embedded microphone and camera in the smartphone that records the audience's reactions to the video scene. The audience reactions including emotions, sentiments, and the like can be analyzed utilizing the analytics module 420 on the server 401. These emotions, sentiments and the like can further annotate the video scenes on the reference database 402.

The audience can be any type of audience including individuals at a movie theater, family members watching a personal video, and the like. The client 406 can include smart television and other systems that can communicate with the sensors 430 and transmit the sensor data from the sensors 430 to the server to be analyzed by the analytics module 420. The system 400 records verbal queues and comments made by the audience while watching the video scene and utilize the NLP module 404 to extract phrases and keywords for analysis. In addition, the system 400 would utilize the sensors 430 to record facial expression and body gestures of the audience while the audience is viewing the video scene. This sensor data can be analyzed by the analytics module 420 utilizing sentiment analysis and emotion analysis. For example, reactions that could be recorded can include reactions such as, for example, surprised, scared, crying, exuberant, and the like. In one or more embodiments, based at least in part on the reactions of the audience, the system 400 can annotate the video scene being viewed by the audience. The annotations can include the emotional reactions of the audience.

Advantages of including an audience reaction to a video scene include confirming sentiment analysis of the scene. The sentiment analysis and emotion analysis can be performed using any suitable learning algorithm such as, for example, machine learning. An audience reaction can confirm or reject a label created by the learning algorithm and assist with teaching the learning algorithm. For example, with sentiment analysis, the learning algorithm can identify sentiment based on the entities, audio content, and relationships in the scene. The sentiment identified can have a confidence level associated with it. Based at least in part on the confidence level, an audience reaction can be obtained to confirm or reject the sentiment for a scene. If the sentiment for a scene is labeled as a "sad" scene but the audience reaction includes "joy" and "laughter," then the label can be adjusted to match the audience reaction and train the machine learning algorithm.

In one or more embodiments of the present invention, the system 400 can be utilized for navigating digital video. A user makes a request for a particular scene in a video through the user input module 407 on a client 406. The client 406 can be a personal computing device, a television, a smartphone or other smart device, and the like. The user input module 407 is configured to receive a user query for a scene in a video through an audio input by the user, textual input, or graphics input from the user. For example, a user can type their request on a peripheral device for the client 406 as a textual input, such as a keyboard or mouse selecting letters on a screen. Also, the user can verbally communicate a request through a peripheral device communicatively coupled to the client 406 such as a microphone or the like in electronic communication with the client 406. The user can also select, via the user input module 407, a graphic representation of the query. For example, a query can include an icon representing an action scene in a video or a love scene in the video. In this case, the user can select the icon to submit the query to the server 401.

The client 406 receives the user input through the user input module 407 and queries the server 401 to find one or more video scenes that best match the user's request. The server 401 has video data stored in a reference database 402. The video data includes video scenes with corresponding annotations (sometimes referred as "tags" or "keywords"). The annotations include labels or tags that describe objects, sentiments, actions, entities, and concepts in the video scene. The objects can include actors, vehicles, locations, buildings, animals, and the like. The concepts can include emotions for a scene such as romance, joy, happiness, and the like. Concepts can also include categories for the scene such as action, thrilling, scary, and the like.

In one or more embodiments of the invention, the user input module 407 receives a query from a user and transmits to the communication module 408. The query is sent to the NLP module 404 for analysis. The NLP module 404 can convert the audio query into text format utilizing techniques, such as, for example, speech to text (STT). The NLP module 404 analyzes the query in textual format to extract keywords from the query language. For example, a query requesting "the scene where Bill hits a home run." The extracted keywords would include "Bill," "home run," and "hits." The extracted keywords are utilized to identify extended keywords. In the previous example, extended keywords can include "baseball," "baseball field," "bat," "uniform," "score," and the like. Extended keywords can also include actor names where the keyword "Bill" would extend to the full name of the actor or the full name of the character in the movie. The keywords and the extended keywords are compared to the annotated scenes in the reference database 402 by the scene query module 409 to find one or more matching scenes that best match the keywords and the extended keywords. The one or more matching scenes can be presented to a user on the display module 410 for the client 406.

Advantages of using an NLP module 404 to receive a user input include creating a user-friendly way for the user to access video content. The client 406 can include any type of electronic device including a smartphone. Smartphones typically do not have an easy way of inputting a search request, unlike a computer which has a keyboard for typing out a search request. Receiving an audio request and being able to extract keywords allows advantages and flexibility for types of clients 406.

Employing sentiment and emotion analysis creates advantages for labeling the video scenes to give a user more options for searching. Typically, a user would try to describe locations or characters when looking for a scene. Instead, with the ability to include emotions and sentiments, a user is able to cast a broader search of the scene especially if the user did not remember the characters names or descriptions in the scene. Additionally, a user may not be looking for a particular scene. Instead, the user may want a scene that carries a certain emotion. For example, if a user is preparing a presentation and wants to find an "uplifting" scene to include in the presentation; the user can search for an "uplifting scene" and the system 400 can return multiple scenes that match the description.

Figure 5:
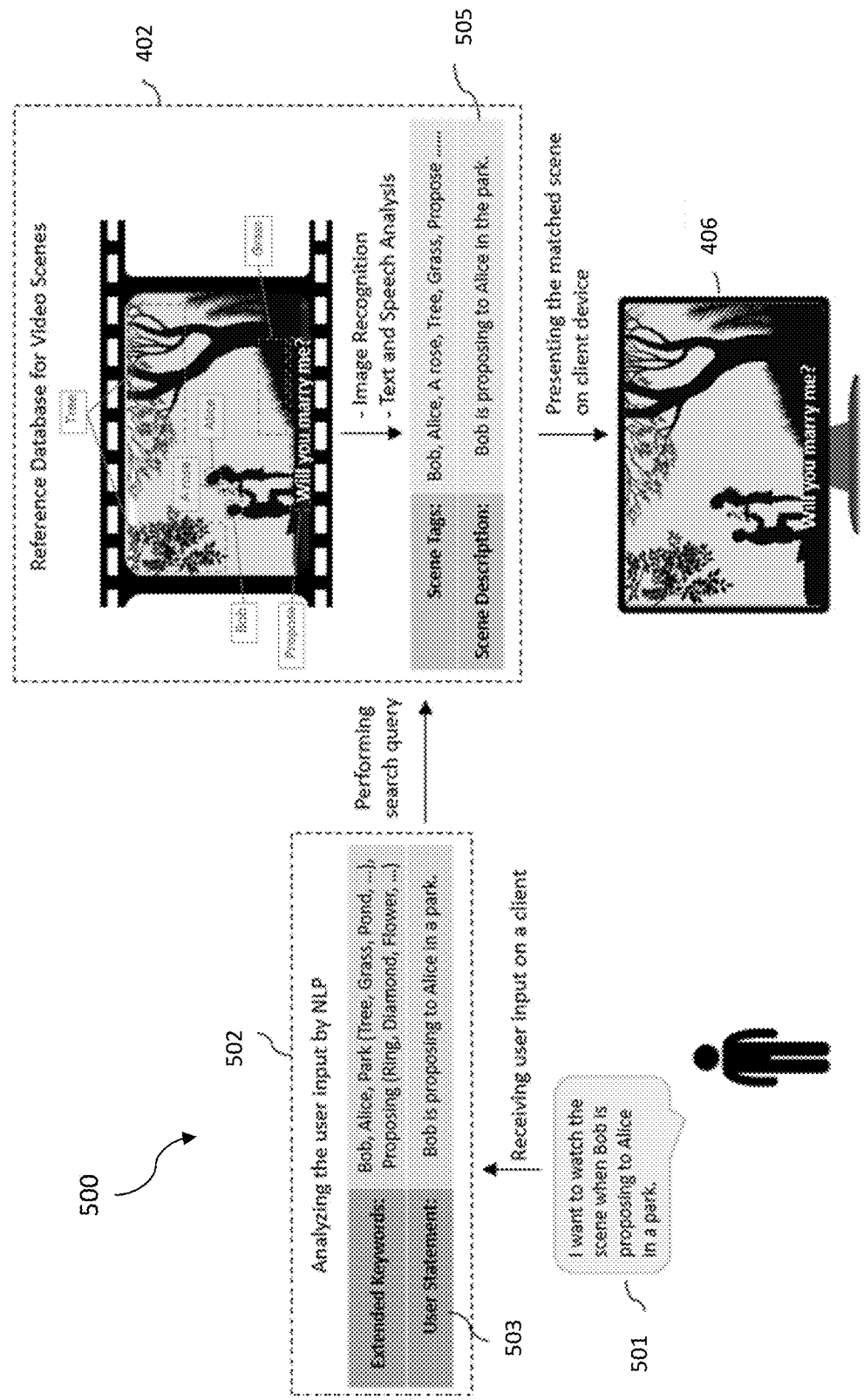
FIG. 5 depicts an illustrative example of a system for navigating digital video according to one or more embodiments.

FIG. 5 depicts an illustrative example of a system for navigating digital video according to one or more embodiments of the present invention. The system 500 includes a user entering a user input 501 stating, "I want to watch the scene when Bob is proposing to Alice in a park." The NLP module 404 is utilized to remove the content of the user input 501 that is not related to the scene description to create the user statement 503. Keywords 502 are extracted from the user statement 503 as well as extended keywords. The keywords 502 extracted include, "Bob," "Alice," "Proposing," and "Park." The extended keywords for "Park" include "Tree, Grass, and Pond." The extended keywords for "Proposing" include "Ring, Diamond, and Flowers." The scene query module 409 (of FIG. 4) compares the keywords and the extended keywords to video scenes in the reference database 402 to determine one or more video scenes that match the keywords and extended keywords. As depicted, the video scene in the reference database 402 includes annotations in the form of scene tags and a scene description 505. These annotations have been applied utilizing the techniques described above. In the illustrative example, the scene tags include "Bob, Alice, A rose, Tree, Grass, and Propose." Additionally, the scene description 505 includes "Bob is proposed to Alice in the park." Based at least in part on the comparison of the keywords of the user statement to the annotations of the video scene, a video scene is selected by the scene query module 409 and presented to the client 406 for display.

In one or more embodiments of the present invention, the scene query module 409 can determine a confidence value for an identified video scene based on the comparison of the user input keywords and the annotations of the video scenes. This confidence value can be displayed on the client device 406 when presenting a list of potentially matched scenes. Based at least in part on the user selecting a particular scene, the server 401 can increase a confidence level for the annotation of the video scene and update the annotation for the video scene. For example, if 4 of 5 keywords match the annotation of the video scene and the user subsequently selects the particular scene, the video scene can be updated with the 5th keyword for better annotation as confirmed by the user. In one or more embodiments of the invention, the annotations for video scenes can be continuously updated based on the query language and subsequent selection by multiple users of the system.

In one or more embodiment of the invention, the image recognition module 403 can be used to identify an object within a video scene and machine learning techniques can be utilized to verify the identification. For example, in FIG. 5, the scene includes a rose and the image recognition module 403 could return tags such as, for example, "flower," "rose," or "red flower." The image recognition module 403 can compare these tags to known (labeled) images of a flower, rose and/or red flower to verify the tag for this object identified in the scene.

Figure 6:
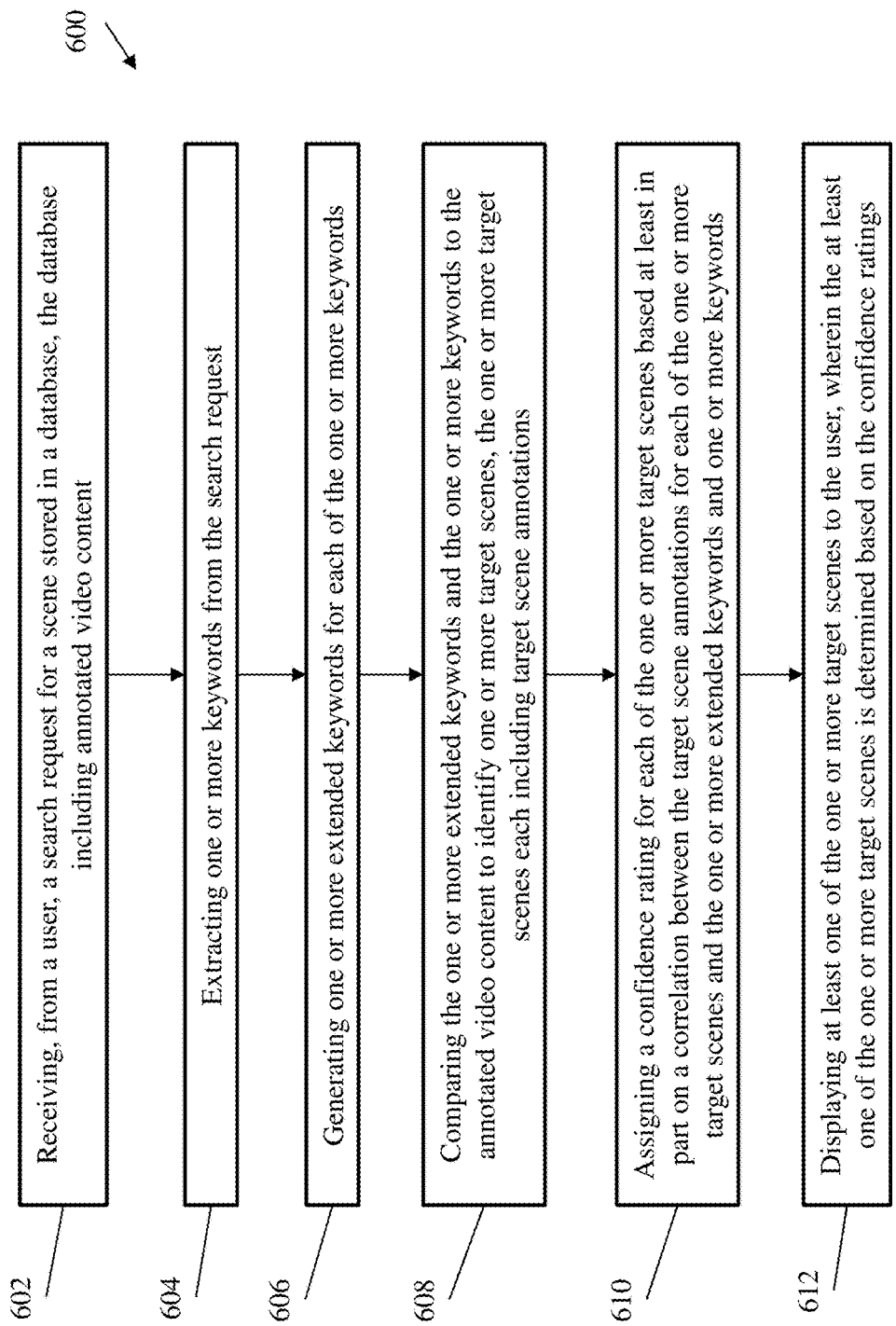
FIG. 6 depicts a flow diagram of a method for obtaining a scene from a database in accordance with one or more embodiments.

Referring now to FIG. 6 there is shown a flow diagram of a method 600 for obtaining a scene from a database according to one or more embodiment of the invention. The method 600 includes receiving, from a user, a search request for a scene stored in a database, the database including annotated video content, as shown in block 602. At block 604, the method 600 includes extracting one or more keywords from the search request. The method 600, at block 606, includes generating one or more extended keywords for each of the one or more keywords. At block 608, the method 600 include comparing the one or more extended keywords and the one or more keywords to the annotated video content to identify one or more target scenes, the one or more target scenes each including target scene annotations. The method 600 includes assigning a confidence rating to each of the one or more target scenes based at least in part on a correlation between the target scene annotations for each of the one or more target scenes and the one or more extended keywords and one or more keywords, as shown at block 610. And at block 612, the method 600 includes displaying at least one of the one or more target scenes to the user, wherein the at least one of the one or more target scenes is determined based on the confidence ratings.

Additional processes may also be included. It should be understood that the processes depicted in FIG. 6 represent illustrations, and that other processes may be added or existing processes may be removed, modified, or rearranged without departing from the scope and spirit of the present disclosure.

Figure 7:
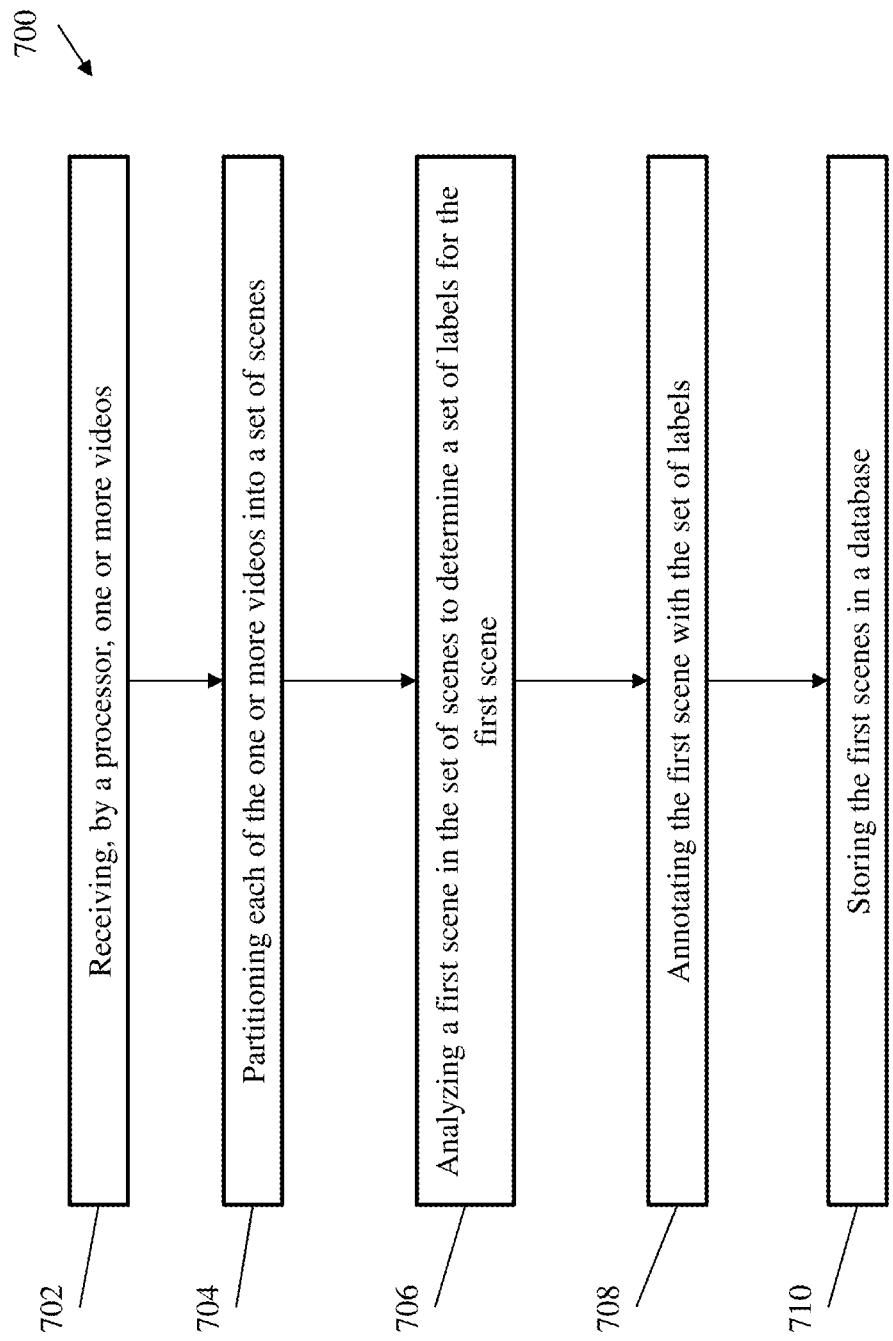
FIG. 7 depicts a flow diagram of a method for annotating video scenes in accordance with one or more embodiments.

Referring now to FIG. 7 there is shown a flow diagram of a method 700 for annotating video scenes according to one or more embodiments of the invention. The method 700 includes receiving, by a processor, one or more videos, as shown at block 702. At block 704, the method 700 includes partitioning each of the one or more videos into a set of scenes. The method 700, at block 706, includes analyzing a first scene in the set of scenes to determine a set of labels for the first scene. At block 708, the method 700 includes annotating the first scene with the set of labels. And at block 710, the method 700 includes storing the first scenes in a database.

Additional processes may also be included. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for obtaining a scene from a database, the method comprising:
    receiving, from a user, a search request for a scene stored in a database, the database including annotated video content;
    extracting one or more keywords from the search request;
    determining a sentiment for the search request;
    generating one or more extended keywords for each of the one or more keywords, wherein the one or more extended keywords are generated based on a selection of complementary keywords for the one or more keywords;
    comparing the one or more extended keywords, the sentiment, and the one or more keywords to the annotated video content to identify one or more target scenes, the one or more target scenes each including target scene annotations, wherein the target scene annotations comprise a target scene sentiment;
    assigning a confidence rating to each of the one or more target scenes based at least in part on a correlation between the target scene annotations for each of the one or more target scenes and the sentiment, the one or more extended keywords, and one or more keywords; and
    displaying at least one of the one or more target scenes to the user, wherein the at least one of the one or more target scenes is determined based on the confidence ratings;
    receiving, from the user, an indication of a selection of a target scene in the one or more target scenes; and
    updating the target scene annotations based at least in part on the selection;
    monitoring the user to determine an emotional response of the user as the user is watching the target scene;
    comparing the emotional response of the user to the target scene sentiment to determine a correlation between the emotional response and the target scene sentiment; and
    updating the target scene sentiment based at least in part on the correlation between the emotional response and the target scene sentiment.

2. The method of claim 1 further comprising:
    displaying the one or more target scenes to the user;
    receiving, from the user, an indication of a rejection of a target scene in the one or more target scenes; and
    updating the target scene annotations based at least in part on the rejection.

3. The method of claim 1, wherein the search request is a user audio input and the extracting one or more keywords comprises:
    performing natural language processing on the search request to convert the user audio input to text;
    partitioning the text in to one or more separate phrases; and
    analyzing the one or more separate phrases to determine keywords.

4. The method of claim 1 further comprising:
    displaying the one or more target scenes to the user; and
    ordering the displaying of the one or more target scenes according to the confidence rating.

5. A computer system for obtaining a scene from a database comprising:
    a processor communicatively coupled to a memory, the processor configured to:
        receive, from a user, a search request for a scene stored in a database, the database including annotated video content;
        extract one or more keywords from the search request;
        determine a sentiment for the search request;
        generate one or more extended keywords for each of the one or more keywords, wherein the one or more extended keywords are generated based on a selection of complementary keywords for the one or more keywords;

compare the one or more extended keywords, the sentiment, and the one or more keywords to the annotated video content to identify one or more target scenes, the one or more target scenes each including target scene annotations, wherein the target scene annotations comprise a target scene sentiment; and assign a confidence rating for each of the one or more target scenes based at least in part on a correlation between the target scene annotations for each of the one or more target scenes and the sentiment, the one or more extended keywords, and one or more keywords;

display at least one of the one or more target scenes to the user, wherein the at least one of the one or more target scenes is determined based on the confidence ratings;

receive, from the user, an indication of a selection of a target scene in the one or more target scenes; and update the target scene annotations based at least in part on the selection;

monitor the user to determine an emotional response of the user as the user is watching the target scene;

compare the emotional response of the user to the target scene sentiment to determine a correlation between the emotional response and the target scene sentiment; and update the target scene sentiment based at least in part on the correlation between the emotional response and the target scene sentiment.

6. The computer system of claim 5, wherein the processor is further configured to:
display the one or more target scenes to the user;
receive, from the user, an indication of a selection of a target scene in the one or more target scenes; and
update the target scene annotations based at least in part on the selection.

7. The computer system of claim 5, wherein the processor is further configured to:
display the one or more target scenes to the user;
receive, from the user, an indication of a rejection of a target scene in the one or more target scenes; and
update the target scene annotations based at least in part on the rejection.

8. The computer system of claim 6, wherein the processor is further configured to:
monitor the user to determine an emotional response of the user as the user is watching the target scene;
compare the emotional response of the user to the target scene annotations to determine a correlation between the emotional response and the target scene annotations; and
update the target scene annotations based at least in part on the correlation between the emotional response and the target scene annotations.

9. A computer program product for obtaining a scene from a database, the computer program product comprising a computer readable storage medium having program instructions embodied therewith, the program instructions executable by a processor to cause the processor to perform:
receiving, from a user, a search request for a scene stored in a database, the database including annotated video content;
extracting one or more keywords from the search request;
determining a sentiment for the search request;
generating one or more extended keywords for each of the one or more keywords, wherein the one or more extended keywords are generated based on a selection of complementary keywords for the one or more keywords;
comparing the one or more extended keywords, the sentiment, and the one or more keywords to the annotated video content to identify one or more target scenes, the one or more target scenes each including target scene annotations, wherein the target scene annotations comprise a target scene sentiment; and
assigning a confidence rating for each of the one or more target scenes based at least in part on a correlation between the target scene annotations for each of the one or more target scenes and the sentiment, the one or more extended keywords, and one or more keywords;
displaying at least one of the one or more target scenes to the user, wherein the at least one of the one or more target scenes is determined based on the confidence ratings;
receiving, from the user, an indication of a selection of a target scene in the one or more target scenes; and
updating the target scene annotations based at least in part on the selection;
monitoring the user to determine an emotional response of the user as the user is watching the target scene;
comparing the emotional response of the user to the target scene sentiment to determine a correlation between the emotional response and the target scene sentiment; and
updating the target scene sentiment based at least in part on the correlation between the emotional response and the target scene sentiment.

10. The computer program product of claim 9 further comprising:
displaying the one or more target scenes to the user;
receiving, from the user, an indication of a selection of a target scene in the one or more target scenes; and
updating the target scene annotations based at least in part on the selection.

11. The computer program product of claim 9 further comprising:
displaying the one or more target scenes to the user;
receiving, from the user, an indication of a rejection of a target scene in the one or more target scenes; and
updating the target scene annotations based at least in part on the rejection.

12. The computer program product of claim 10 further comprising:
monitoring the user to determine an emotional response of the user as the user is watching the target scene;
comparing the emotional response of the user to the target scene annotations to determine a correlation between the emotional response and the target scene annotations; and
updating the target scene annotations based at least in part on the correlation between the emotional response and the target scene annotations.

13. The computer program product of claim 9, wherein the search request is a user audio input and the extracting one or more keywords comprises:
performing natural language processing on the search request to convert the user audio input to text;
partitioning the text in to one or more separate phrases; and
analyzing the one or more separate phrases to determine keywords.

* * * * *